United States Patent
Okada et al.

(10) Patent No.: US 11,330,134 B2
(45) Date of Patent: May 10, 2022

(54) IMAGE READING DEVICE HAVING A RECTANGULAR-SHAPED OPENING ON A SIDE OF A READING TARGET, WHEREIN LONG SIDES OF THE RECTANGULAR SHAPED OPENING INCLUDING A FIRST LAYER, A SECOND LAYER AND AN INTERFACE BETWEEN THE FIRST LAYER AND THE SECOND LAYER THAT HAS AN ARCHED SHAPE WARPING FROM A CENTER PORTION OF THE RECTANGULAR-SHAPED OPENING

(71) Applicant: Mitsubishi Electric Corporation, Chiyoda-ku (JP)

(72) Inventors: Masaaki Okada, Chiyoda-ku (JP); Toru Shiraki, Chiyoda-ku (JP); Daisuke Ohama, Chiyoda-ku (JP); Homare Takeda, Chiyoda-ku (JP); Masahiko Takashina, Chiyoda-ku (JP); Yuki Okuhigashi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 247 days.

(21) Appl. No.: 16/485,329

(22) PCT Filed: Apr. 11, 2018

(86) PCT No.: PCT/JP2018/015213
§ 371 (c)(1),
(2) Date: Aug. 12, 2019

(87) PCT Pub. No.: WO2018/190368
PCT Pub. Date: Oct. 18, 2018

(65) Prior Publication Data
US 2021/0306505 A1    Sep. 30, 2021

(30) Foreign Application Priority Data

Apr. 12, 2017    (JP) .............................. JP2017-078723

(51) Int. Cl.
*H04N 1/00*    (2006.01)
*H04N 1/024*    (2006.01)
(Continued)

(52) U.S. Cl.
CPC ....... *H04N 1/02409* (2013.01); *G02B 6/0088* (2013.01); *H04N 1/00816* (2013.01); *H04N 1/02895* (2013.01)

(58) Field of Classification Search
CPC ............. H04N 1/0281; H04N 1/02835; H04N 1/02885; H04N 1/02895; H04N 1/0318;
(Continued)

(56) References Cited

U.S. PATENT DOCUMENTS 5,182,445 A * 1/1993 Yamashita ........... H04N 1/0314
250/208.1
5,399,850 A * 3/1995 Nagatani .................. G06K 7/14
250/208.1
(Continued)

FOREIGN PATENT DOCUMENTS

JP    2000-32211 A    1/2000
JP    2001-238048 A    8/2001
(Continued)

OTHER PUBLICATIONS

Combined Chinese Office Action and Search Report dated Dec. 2, 2020 in Patent Application No. 201880020387.3 (with English language translation), 16 pages.
(Continued)

*Primary Examiner* — Chad Dickerson
(74) *Attorney, Agent, or Firm* — Oblon, McClelland, Maier & Neustadt, L.L.P.

(57) ABSTRACT

An image-reading apparatus includes a housing having a rectangular-shaped opening on a side of a reading target, a lens portion retained or housed within the housing, and a sensor element to receive light condensed by the lens portion, the light being from the reading target. Long sides of the opening include a first layer that is flat and is disposed on the side of the reading target and a second layer that is continuous with the first layer. The long sides of the opening of the housing of the image-reading apparatus has a flat surface on the side of the reading target and an interface between the first layer and the second layer that is curved.

20 Claims, 9 Drawing Sheets

(51) Int. Cl.
  *F21V 8/00* (2006.01)
  *H04N 1/028* (2006.01)
  *G06T 1/00* (2006.01)
(58) Field of Classification Search
  CPC .............. H04N 1/193; H04N 1/02409; H04N 1/00816; H04N 1/0088
  USPC .............. 358/474, 482, 494; 250/208.1, 239
  See application file for complete search history.

(56) References Cited

U.S. PATENT DOCUMENTS

| | | | |
|---|---|---|---|
| 5,949,062 A * | 9/1999 | Matsumoto | H04N 1/0318 250/208.1 |
| 6,448,995 B1 | 9/2002 | Fujimoto et al. | |
| 2001/0015892 A1 | 8/2001 | Fujimoto et al. | |
| 2015/0381848 A1 * | 12/2015 | Matsui | H04N 1/193 358/482 |

FOREIGN PATENT DOCUMENTS

| | | |
|---|---|---|
| JP | 2010-56619 A | 3/2010 |
| JP | 2014-165588 A | 9/2014 |
| JP | 2015-207922 A | 11/2015 |
| JP | 2016-127552 A | 7/2016 |

OTHER PUBLICATIONS

International Search Report dated Jul. 17, 2018 in PCT/JP2018/015213 filed on Apr. 11, 2018.
Japanese Office Action dated Nov. 20, 2018 in Japanese Patent Application No. 2018-544275 (with unedited computer-generated English translation), citing documents AO and AP therein.
Japanese Office Action dated Apr. 16, 2019 in Japanese Patent Application No. 2018-544275 (with unedited computer-generated English translation), citing documents AP and AT therein.

* cited by examiner

IMAGE READING DEVICE HAVING A RECTANGULAR-SHAPED OPENING ON A SIDE OF A READING TARGET, WHEREIN LONG SIDES OF THE RECTANGULAR SHAPED OPENING INCLUDING A FIRST LAYER, A SECOND LAYER AND AN INTERFACE BETWEEN THE FIRST LAYER AND THE SECOND LAYER THAT HAS AN ARCHED SHAPE WARPING FROM A CENTER PORTION OF THE RECTANGULAR-SHAPED OPENING

TECHNICAL FIELD

The present disclosure relates to an image-reading apparatus such as a contact image sensor that can be used in a facsimile, copy machine, scanner, and the like.

BACKGROUND ART

Among conventional image-reading apparatuses, there is a conventional image-reading apparatus that includes a cover (housing) that is a substantially frame-shaped component made with a resin. A transparent plate is fitted into a hole (opening) of such a cover (see Patent Literature 1, for example). There is also an image-reading apparatus that is without any transparent plate. Specifically, there is an apparatus in which casing (frame, housing) is supported such that the casing is located below a document placement plate corresponding to a transparent body and moves freely while facing the bottom surface (undersurface) of the document placement plate (see Patent Literature 2, for example).

Also, among the image-reading apparatuses, an image-reading apparatus is disclosed that is capable of ensuring a modulation transfer function (MTF) performance across an entire region along a lens array in the longitudinal direction (main scanning direction) even in a case where there is warpage of a frame (housing) in the longitudinal direction. Specifically, in an image-reading apparatus where a lens array constituting an equal magnification optical system and a light-receiving element array are fixed to the frame in the longitudinal direction, a warpage amount of approximately half of a warpage amount of a light-receiving element array is formed in the lens array in the optical axis direction thereof (see Patent Literature 3, for example).

Furthermore, among the image-reading apparatuses, there is an image-reading apparatus that ensures illuminance within an illumination range without causing relative positions of a lens array that determines an image-reading position and a light guide body that determines an illumination position to shift even in a case where a frame (housing) is warped in the longitudinal direction (main scanning direction) of the image-reading apparatus (see Patent Literature 4, for example).

CITATION LIST

Patent Literature

Patent Literature 1: Unexamined Japanese Patent Application Kokai Publication No. 2014-165588
Patent Literature 2: Unexamined Japanese Patent Application Kokai Publication No. 2001-238048
Patent Literature 3: Unexamined Japanese Patent Application Kokai Publication No. 2015-207922
Patent Literature 4: Unexamined Japanese Patent Application Kokai Publication No. 2016-127552

SUMMARY OF INVENTION

Technical Problem

However, the conventional image-reading apparatuses have a shortcoming in that, when the strength or manufacturing accuracy of the housing is low, the housing warps thereby causing warpage along the long sides (sides in the longitudinal direction, sides in the main scanning direction) of the opening of the housing and/or a transparent plate placed along these long sides (sides in the longitudinal direction, sides in the main scanning direction) on the side of a reading target. Preferably, there is a uniform space in the main scanning direction between (i) the long sides (sides in the longitudinal direction, sides in the main scanning direction) of the opening of the housing and the end surface of the transparent plate placed along these long sides (sides in longitudinal direction, sides in the main scanning direction) and (ii) a platen roller that presses against and conveys a document (reading target), but this warpage creates a space in which the distance of the gap changes along the main scanning direction, and thus the reading position of the document (reading target) shifts in the main scanning direction. When the position of the document (reading target) shifts, the focal point of the lens array on the side of the document (reading target side) becomes misaligned with the document resulting in an out-of-focus read image or a drop in MTF performance.

In order to solve the aforementioned shortcomings, an objective of the present disclosure is to provide an image-reading apparatus in which the long sides of the opening of the housing on the side of the reading target are flat surfaces.

Solution to Problem

An image-reading apparatus according to the present disclosure includes a housing having a rectangular-shaped opening on a side of a reading target, a lens portion retained or housed within the housing, and a sensor element to receive light condensed by the lens portion, the light being from the reading target, wherein long sides of the opening include a first layer that is flat and is disposed on the side of the reading target and a second layer that is continuous with the first layer, and an interface between the first layer and the second layer is curved.

Advantageous Effects of Invention

According to the present disclosure, since the long sides of the opening of the housing include the flat first layer, the image-reading apparatus in which the long sides of the opening of the housing are flat on the side of the reading target can be attained.

DESCRIPTION OF EMBODIMENTS

Embodiment 1

Embodiment 1 of the present disclosure is described with reference to the drawings. Throughout the drawings (FIGS. 1 to 9B), components that are the same or equivalent are assigned the same reference signs. In the figures, X, Y, and Z denote the Cartesian axes. The X-axis direction is the main scanning direction (longitudinal direction), the Y-axis direction is the sub-scanning direction (transverse direction), and the Z-axis direction is the reading distance direction. The origin of the X-axis is set to the middle of length of an image-reading apparatus 1 in the main scanning direction. The origin of the Y-axis is set to the middle of the length of the image-reading apparatus 1 in the sub-scanning direction. The origin of the Z-axis is set the position from which a reading target 11 is conveyed to be read by the image-reading apparatus 1.

Figure 1:
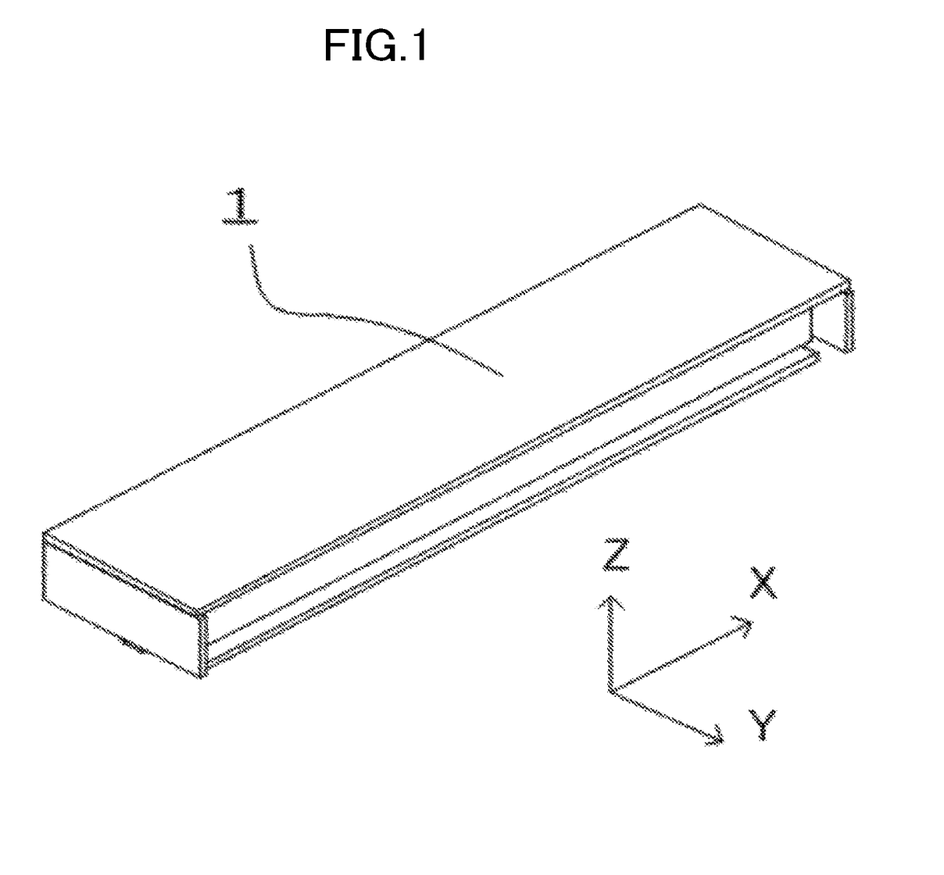
FIG. 1 is a perspective view of an image-reading apparatus according to Embodiment 1 of the present disclosure.
Figure 2:
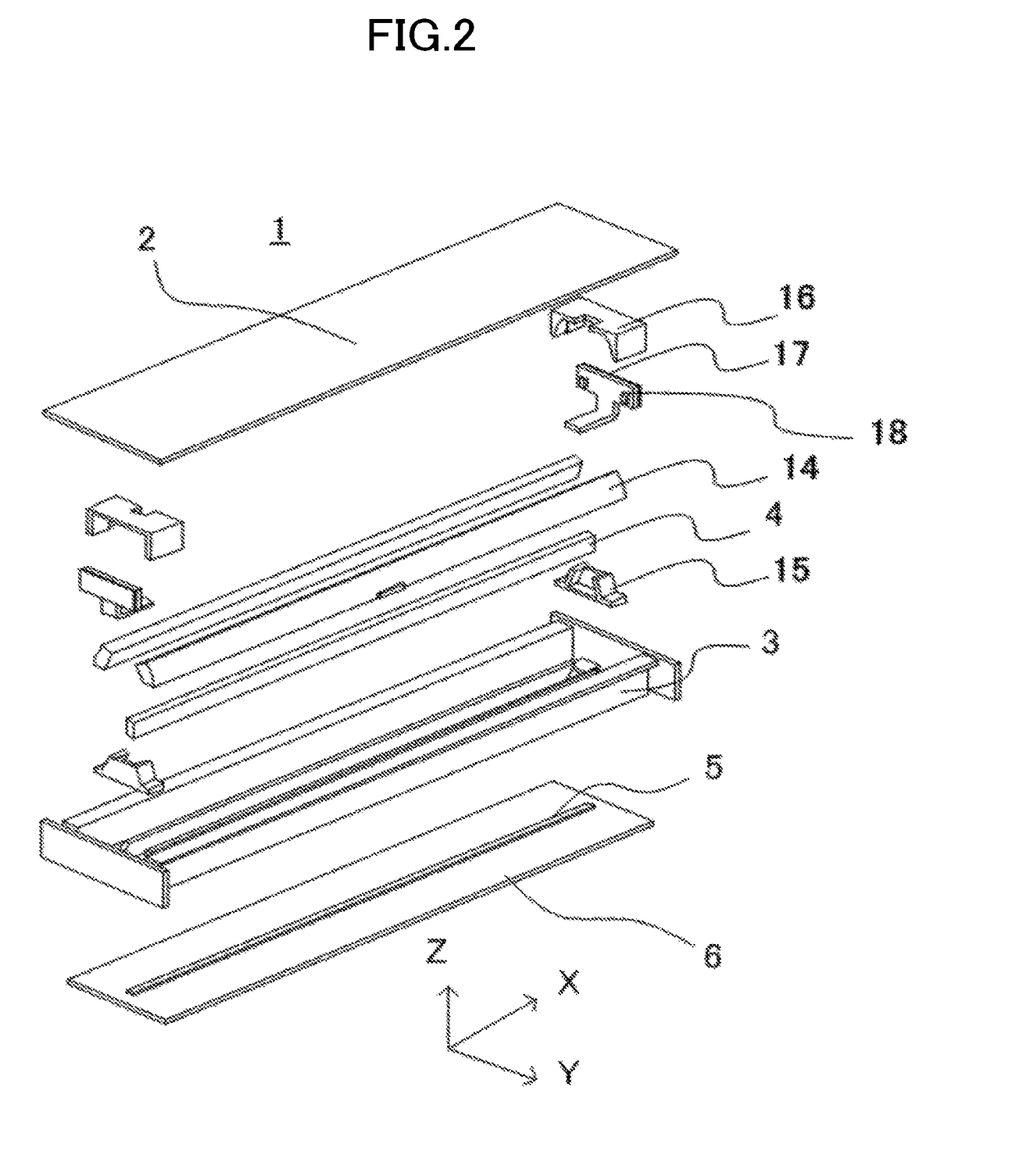
FIG. 2 is an exploded view of the image-reading apparatus according to Embodiment 1 of the present disclosure.
Figure 3:
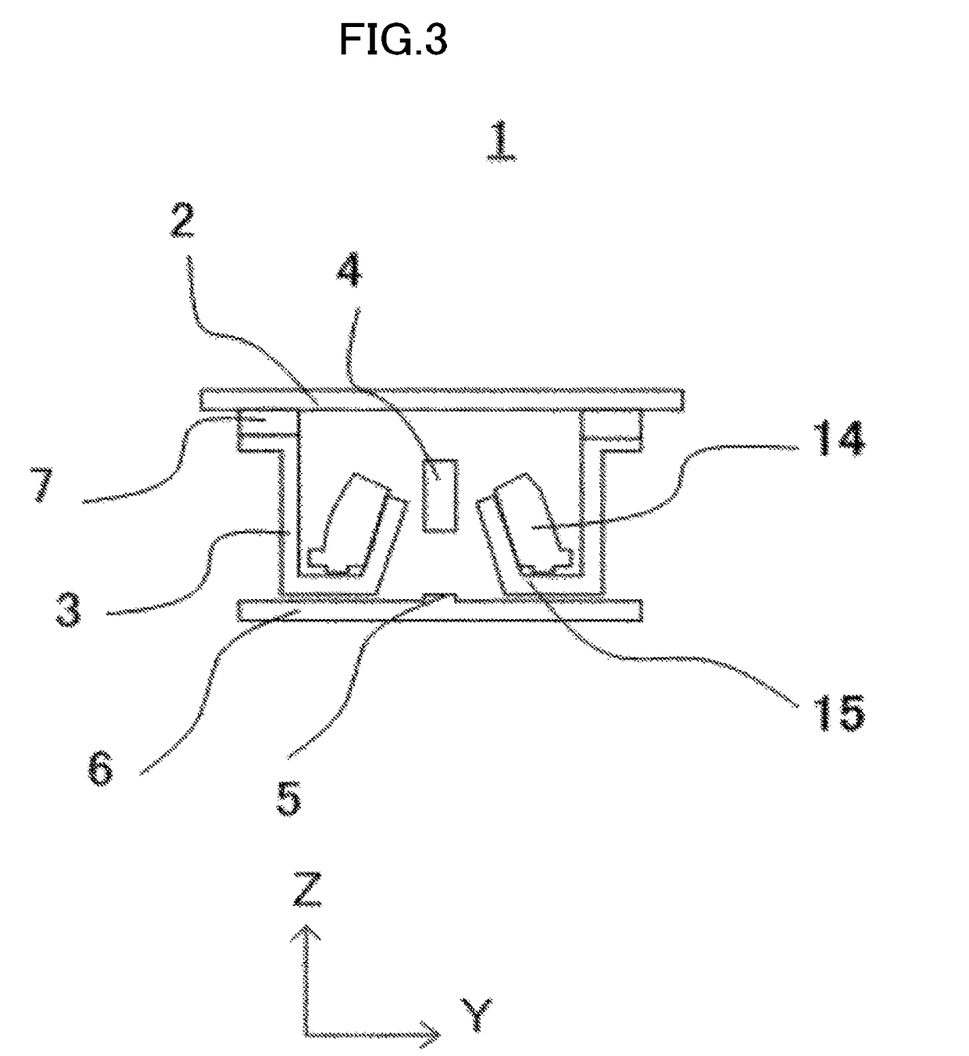
FIG. 3 is a cross-sectional view taken along a sub-scanning direction of a middle portion of the image-reading apparatus in the main scanning direction according to Embodiment 1 of the present disclosure.
Figure 4:
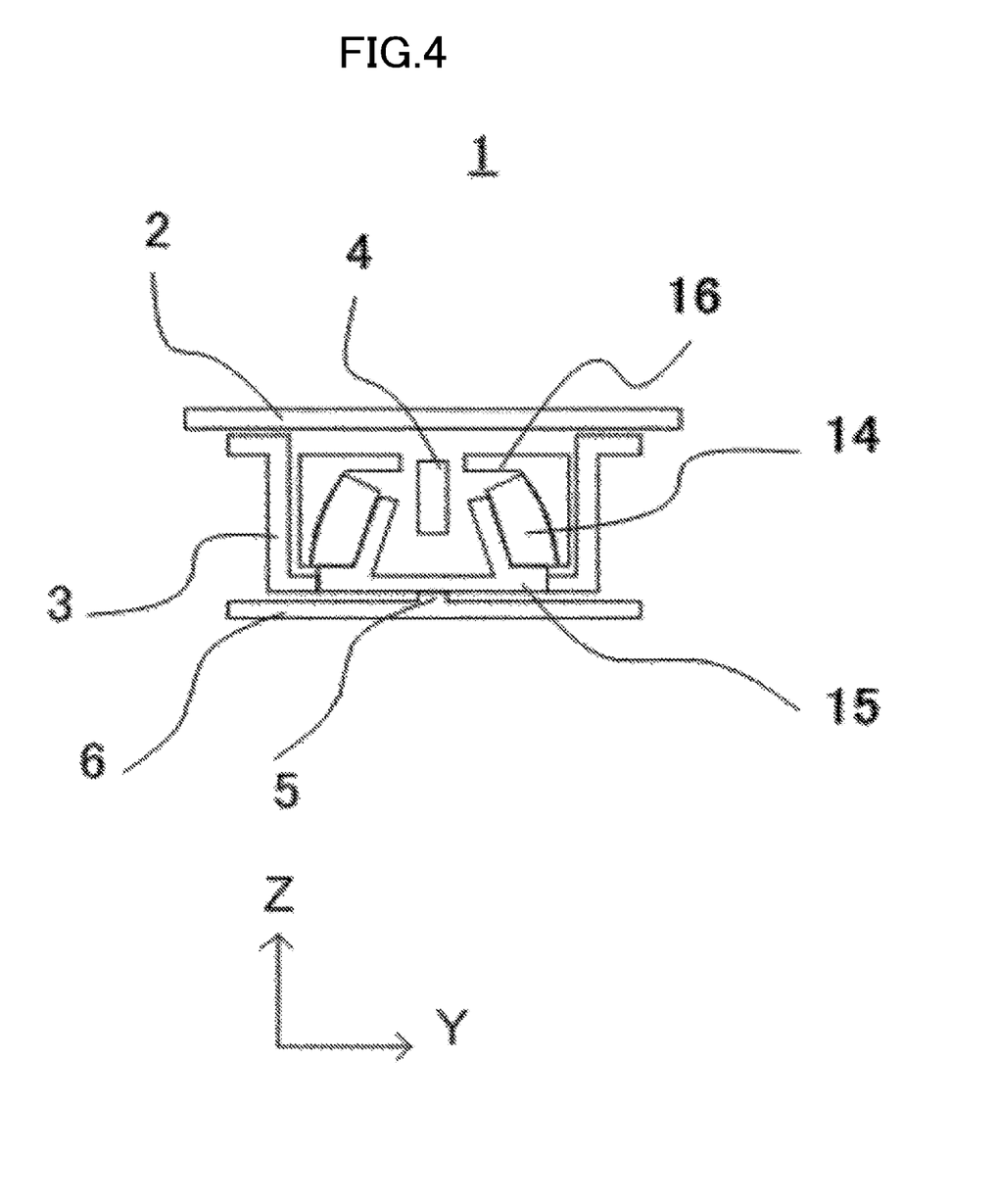
FIG. 4 is a cross-sectional view taken along the sub-scanning direction of an end of the image-reading apparatus in the main scanning direction according to Embodiment 1 of the present disclosure.
Figure 5A:
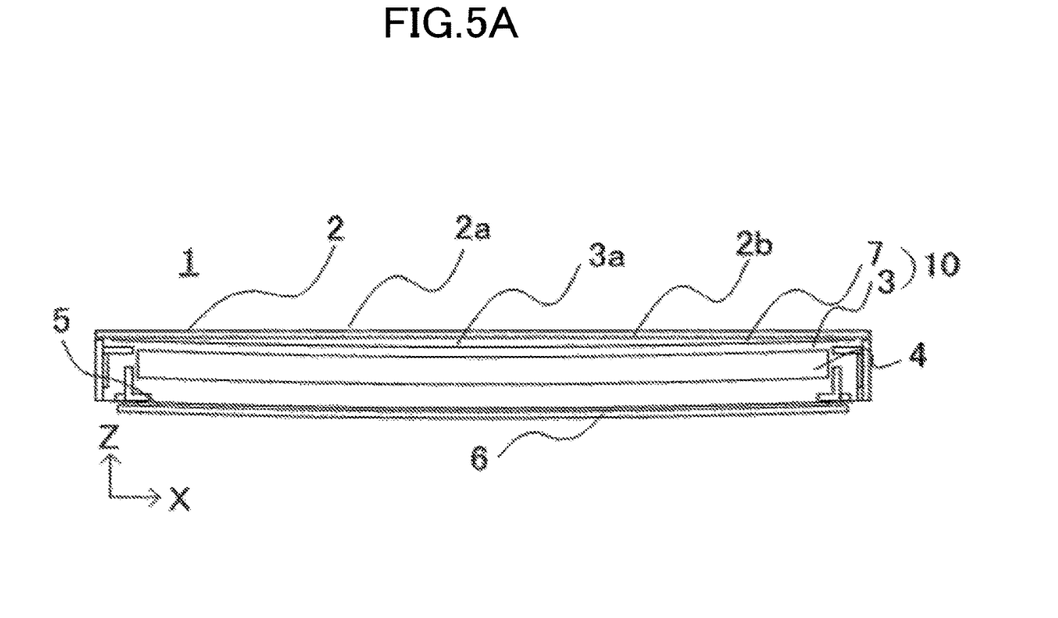
FIG. 5A is a cross-sectional view in the main scanning direction of the image-reading apparatus according to the Embodiment 1.
Figure 5B:
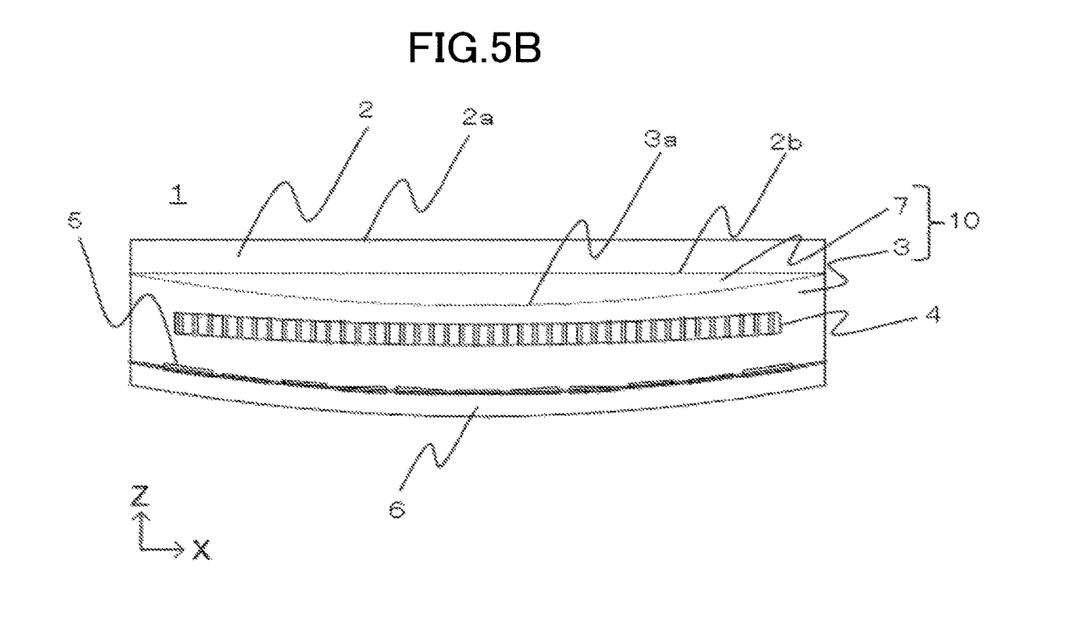
FIG. 5B is a descriptive drawing regarding a frame in FIG. 5A.

FIG. 1 is a perspective view of the image-reading apparatus 1 according to Embodiment 1 of the present disclosure. FIG. 2 is an exploded view of the image-reading apparatus 1 according to Embodiment 1 of the present disclosure. FIG. 3 is a cross-sectional view taken along a sub-scanning direction of a middle portion of the image-reading apparatus 1 in the main scanning direction according to Embodiment 1 of the present disclosure. FIG. 4 is a cross-sectional view taken along the sub-scanning direction at the end in the main scanning direction of the image-reading apparatus 1. FIG. 5A is a cross-sectional view in the main scanning direction of the image-reading apparatus 1 according to the Embodiment 1. FIG. 5B is a descriptive drawing regarding a frame in FIG. 5A. FIGS. 5A and 5B are referred to collectively as FIG. 5 in the following description.

The reading target 11 is a medium to be read (also referred to as object to be illuminated or document) that carries information about, for example, banknotes, securities, as well as other common documents. The image information reading target 11 is read by the image-reading apparatus 1. A light source 18 is light-emitting elements such as light-emitting diodes (LED) or organic electroluminescence (EL) elements that emit red light (R), green light (G), blue light (B), white light (W), ultraviolet light (UV), infrared light (IR), and the like in accordance with the image information to be read. The light source 18 is mounted on the light source base 17.

A light guide 14 is made with, for example, a resin or glass, and extends in the X-axis direction. The light guide 14 has an incident surface at an end in the X-axis direction. The light source 18 is placed to face the incident surface. Light emitted from the light source 18 enters the inside of the light guide 14 from the incident surface and is guided while propagating in the X-axis direction. The light guide 14 has, at one end in the Z-axis direction, a flat surface portion that extends in the X-axis direction. The flat surface portion has a light-scattering portion formed in the X-axis direction. The light-scattering portion has a scattering area having a predetermined length in the Y-axis direction. The light guide 14 has, at the other end in the Z-axis direction, an emission surface that extends in the X-axis direction and that emits light to the outside of the light guide 14. The light guide 14 has a side surface that connects the flat surface portion and the emission surface together and extends in the X-axis direction. This side surface is parabolic and also serves as a reflective surface that reflects light from the light-scattering portion toward the emission surface.

A lens portion 4 is, for example, rod lenses arranged in an array. The lens portion 4 is set between the reading target 11 and a sensor base 6 and is held on a frame 3 by a retaining member, such as an adhesive or tape. The lens portion 4 has functionality to condense light emitted from an illumination device and reflected by the reading target 11, and form an image on a sensor element 5 (sensor element array 5). The sensor element 5 (sensor element array 5) converts the formed light into an electrical signal.

The sensor element array 5, an external connector, and other electronic components such as an application specific integrated circuit (ASIC) are mounted on the sensor base 6. The sensor base 6 is fixed to the frame 3 by with tape, an adhesive, or a screw. The sensor 6 is fixed on a surface of the frame 3 on a side opposite to the side of the reading target 11. In this state, an optical axis of the lens portion 4 (lens array 4) is aligned with a light receiving portion of the sensor element 5 (sensor element array 5).

A holder 16 is provided at ends of the light guide 14 in the X-axis direction. The ends of the light guide 14 are inserted into holes of the holder 16. The holder 16 into which the light guide 14 is inserted is fixed to the ends of the support 15 and the frame 3 in the main scanning direction, the holder 16 sandwiching the light guide 14 together with the flat surface of the support 15 projecting in the sub-scanning direction and the erected portion of the support 15 that is inclined upwards from the flat surface.

The image-reading apparatus 1 according to Embodiment 1 includes the frame 3 having a rectangular opening on a side of a reading target 11 such as a document 11, the lens portion 4 retained or housed on the frame 3, and the sensor element 5 that receives light condensed by the lens portion 4 from the reading target. The frame 3 is rectangular-shaped with the main scanning direction being the longitudinal direction. The transverse direction of the frame 3 corresponds to the sub-scanning direction (conveyance direction of the reading target).

The image-reading apparatus 1 in FIG. 5 is provided as a contact image sensor apparatus that includes the transparent plate 2, the frame 3, a lens array 4 in which lenses are arranged in the main scanning direction serving as the lens portion 4, a sensor element array 5 in which the sensors are arranged in the main scanning direction serving as the sensor element 5, and the sensor base 6.

The long sides (sides along the main scanning direction, sides along the X-axis direction, sides along the longitudinal direction) of the opening of the frame 3 on the side of the reading target 11 include a first layer 7 that is flat and is provided on the side of the reading target 11 and a second layer 3 that is continuous with the first layer 7, and the interface between the first layer 7 and the second layer 3 is curved. The first layer 7 in FIG. 5 is provided as a component that supports the transparent plate 2 which is a flat plate. The transparent plate 2 is made with transparent glass or a transparent resin. Both sides of the transparent plate 2 are flat-shaped along the main scanning direction. The surface of the transparent plate 2 opposite to the surface facing the frame 3 is the reading surface 2a of the reading target 11 such as the document 11, and this surface restricts the reading position of the reading target 11.

The portion that includes the first layer 7 and the second layer 3 may be termed as the frame 3 or the second layer 3 alone may be termed as the frame 3. In the following description, it is assumed that the frame 3 is the second layer 3 and that the frame 3 and the first layer 7 are continuous with each other on the side of reading target 11 of this frame 3. The frame 3 has a rectangular-shaped opening on the side of the reading target 11 such as the document 11. The frame 3 is made with metal such as aluminum or a resin. The frame 3 is warped in the main scanning direction (long side direction) and is shaped with a curved surface 3a that is a recessed curve along the main scanning direction (long side direction). The frame 3 houses or retains the sensor base 6 on which the lens array 4 and the sensor element array 5 are mounted.

The lens array 4 is a plurality of lenses arranged in an array in the main scanning direction, and although not illustrated, the lens array 4 is retained by lens array fixing means formed on the frame 3. The lens array 4 is fixed such that the warpage amount in the main scanning direction is half of the warpage amount of the frame 3. For the lens array 4, for example, a GRIN lens array in which a plurality of GRIN lenses that have a refractive index defined by a prescribed function in a radial direction is arranged in two-dimensional array. This GRIN lens array typically includes columnar lens (referred to simply as lens, hereinafter) that are two-dimensionally arranged and the structure is such that both sides of the array are adhesively fixed in a sandwiched state along the axis direction of the GRIN lens array. The lens array 4 has functionality to condense light that passes through the transparent plate 2 to the sensory element array 5. The lens array 4 is an erect equal magnification imaging optical system that forms images on the sensor element array 5 regarding the reading target 11, such as the document 11 that is read on the reading surface 2a of the transparent plate 2.

The sensory element array 5 is mounted on the sensor base 6 and is an array in which a plurality of sensor elements 5 is arranged two-dimensionally in the main scanning direction. The sensor element array 5 has functionality to receive light condensed by the lens array 4 and photo-electrically convert the received light.

The sensor base 6 is mounted with the sensor element array 5 and is a base made with a resin such as glass epoxy. The sensor base 6 is fixed along the frame 3 on a side of the frame 3 opposite to the side on which the transparent plate 2 is disposed.

As for the transparent plate 2 and the frame 3, a flat surface 2b of the transparent plate 2 and a curved surface 3a formed on the frame 3 in the long side direction are fixed together by adhesion with use of the adhesive 7 while retaining the flatness of the transparent plate 2 and keeping the curvature of the frame 3. When fixing the transparent plate 2 and the frame 3 together by adhesion, the curvature of the frame 3 creates a varied gap in the distance between the flat surface 2b of the transparent plate 2 and the curved surface 3a of the frame in the main scanning direction (long side direction) where the transparent plate 2 and the frame 3 face each other. This gap is closed by filling the gap with the adhesive 7. This gap filled with the adhesive 7 in a hardened state is also referred to as the adhesive layer and corresponds to the first layer 7. In other words, the first layer 7 can be regarded as the portion of adhesive 7 stacked on the frame 3 (second layer 3). The first layer 7 can also be regarded as the filling portion that is in between the transparent plate 2 and the frame 3 (second layer 3). As for the adhesive 7, an adhesive with thermosetting properties, room temperature hardening properties, or ultraviolet (UV) hardening properties may be used. In doing so, the image-reading apparatus 1, the reading surface 2a of the transparent plate 2 has a flat structure along the main scanning direction (long side direction) even if the frame 3 warps (curves) along the main scanning direction.

The frame 3 in a state in which the adhesive layer 7 is stacked on the frame 3 is also referred to as the housing 10. This housing 10 corresponds to the portion (frame 3) that includes the previously-described first layer 7 and the second layer 3. In the housing 10, the adhesive layer 7 is formed on the frame 3 such that these two components are continuous with each other. In other words, in the housing 10, the adhesive layer 7 can also be regarded as the first layer 7 and the frame 3 can also be regarded as the second layer 3. As viewed from the housing 10, the transparent plate 2 is supported by the housing 10. In the housing 10, the upper surface of the adhesive layer 7, that is, the surface on the side of the reading target 11 is flat in shape. In the housing 10, the upper layer of the adhesive layer 7, that is, the interface between the adhesive layer 7 and the frame 3 is curved. This curved interface can also be regarded as the adhesive surface. Although it is conceivable to select a viscous substance as the adhesive 7 or to use a plate-based fixture to prevent flow-out of the adhesive 7 in order to achieve flat surface on the first layer 7 on the side of the reading target 11, other methods are acceptable.

Figure 6:
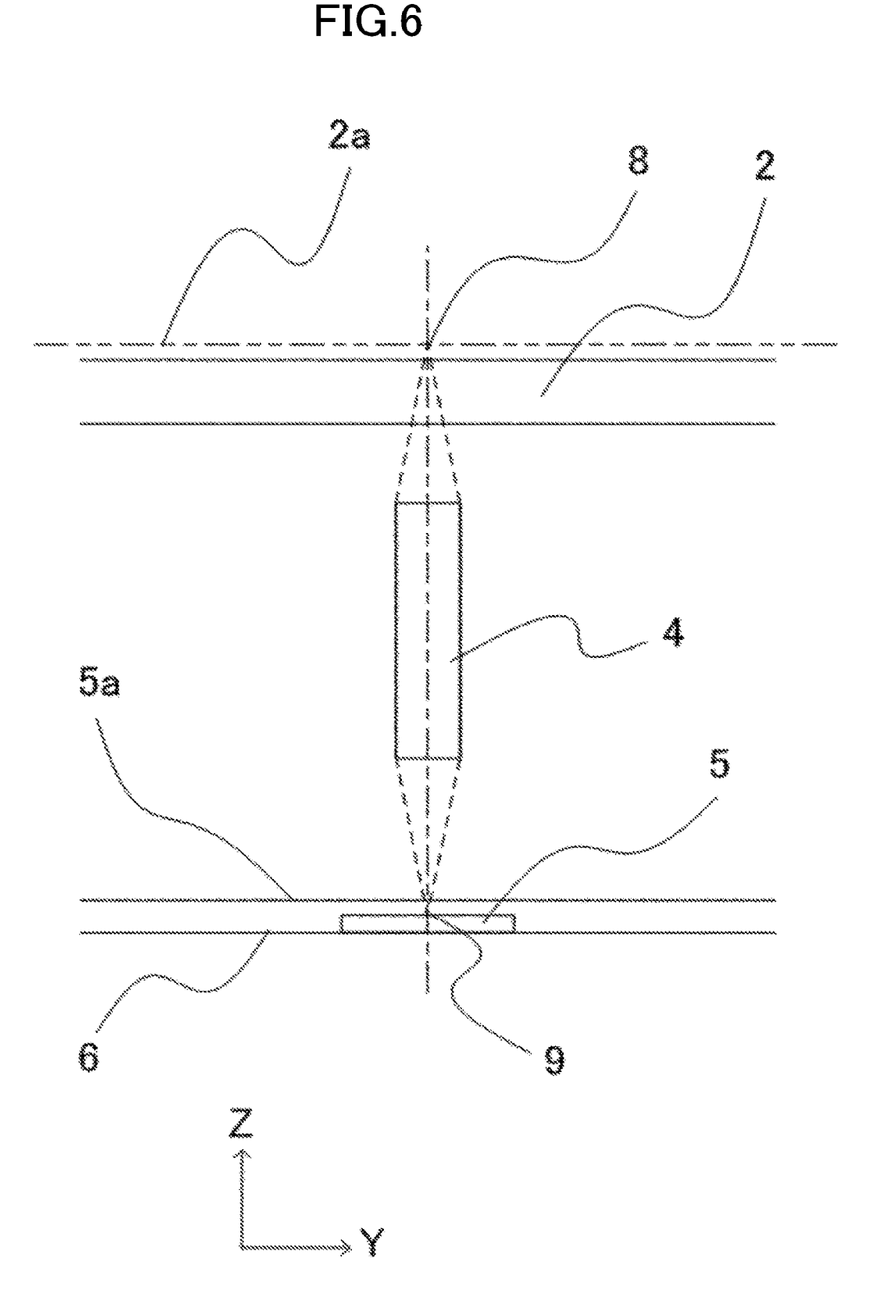
FIG. 6 is a schematic drawing illustrating a focal depth of the image-reading apparatus.

FIG. 6 is a schematic drawing illustrating a focal depth of the image-reading apparatus. In FIG. 6, each lens in the lens array 4 focuses on the reading surface 2a of the transparent plate 2 as a focal point 8 on the side of the reading target 11 and focuses on an image-forming surface 5a of a corresponding sensor element 5 of the sensor element array 5 as a focal point 9 on the image-forming side.

Figure 8A:
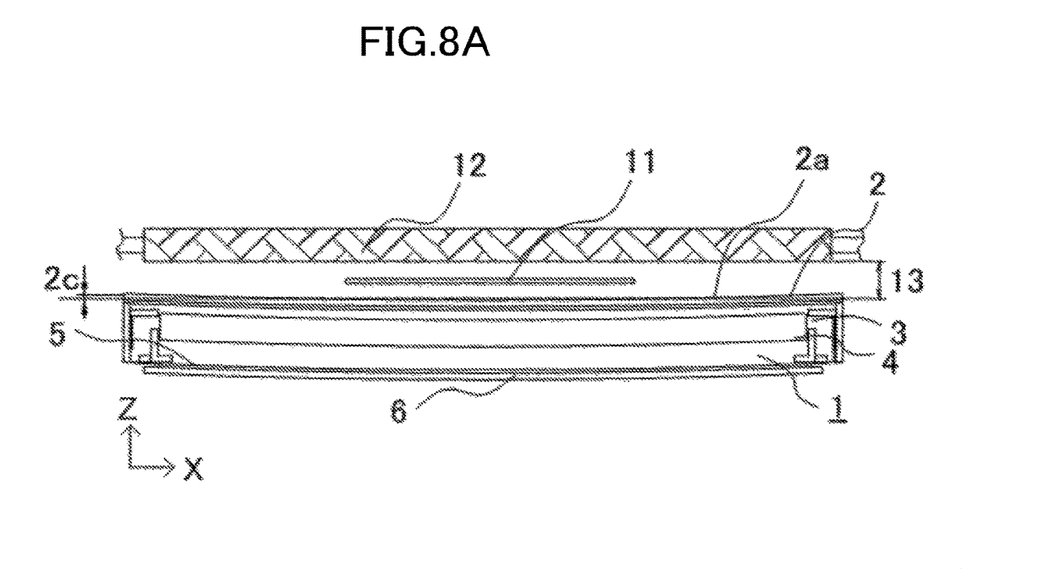
FIG. 8A is a cross-sectional diagram illustrating the document reading position of an image-reading apparatus of a comparative example.
Figure 8B:
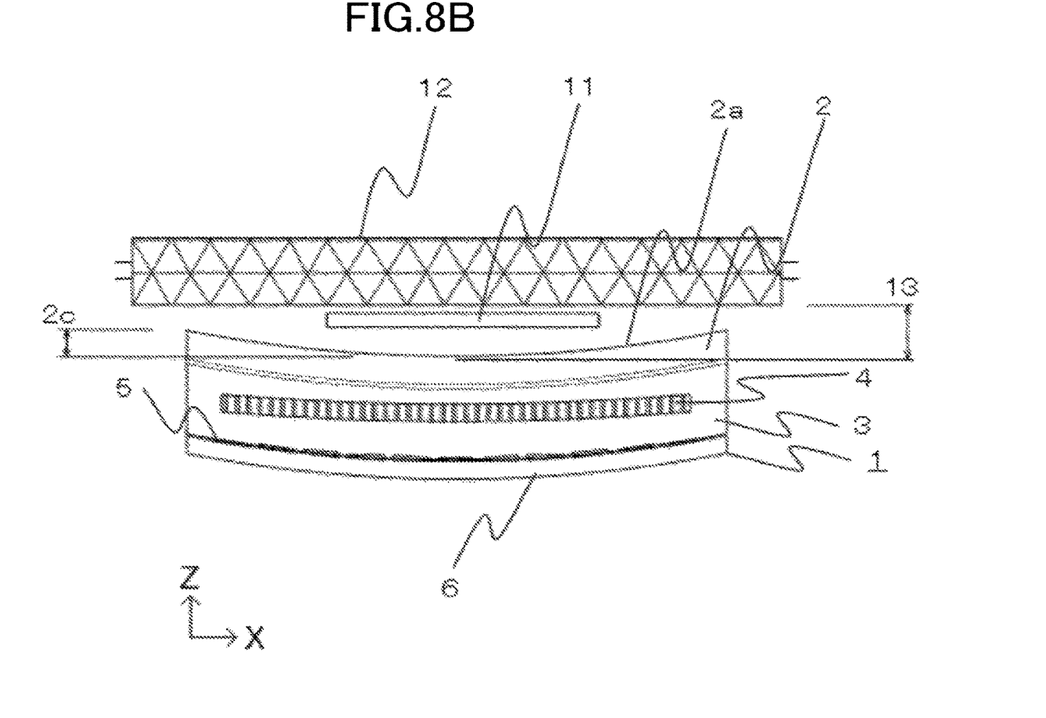
FIG. 8B is a descriptive diagram regarding a frame in FIG. 8A.

FIG. 8A is a cross-sectional diagram in the main scanning direction of an image-reading apparatus of a comparative example. FIG. 8B is a descriptive diagram regarding a frame in FIG. 8A. FIG. 8A and FIG. 8B are referred to collectively as FIG. 8. With the frame 3 as the reference, the transparent plate 2, the lens array 4, the sensor base 6 (sensor element array 5) are integrally attached to the warped (curved) frame 3 along the main scanning direction. Due to the influence on the transparent plate 2 by the warpage of the frame 3, warpage occurs on the transparent plate 2, thereby creating a space 13 that alters the distance in the gap along the main scanning direction between the reading surface 2a of the transparent plate 2 and the platen roller 12 that conveys and presses against the reading target 11 and causes the reading position to shift. When the reading position shifts, the focal point 8 of the lens array 4 on the side of the reading target 11 becomes misaligned with the position of the reading target 11 resulting in an out-of-focus read image or drop in MTF performance.

Figure 7A:
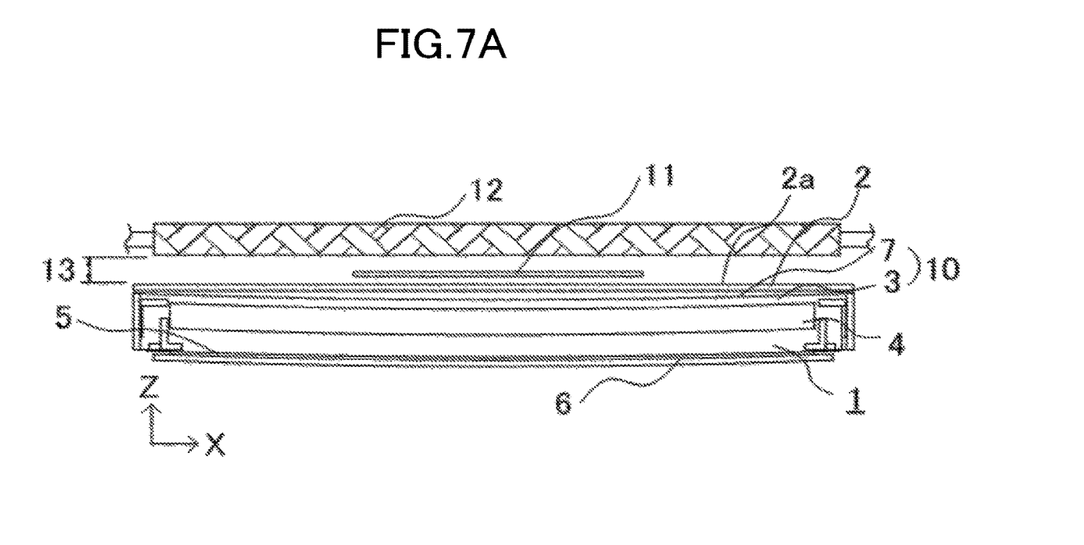
FIG. 7A is a diagram illustrating a document reading position of the image-reading apparatus according to Embodiment 1.
Figure 7B:
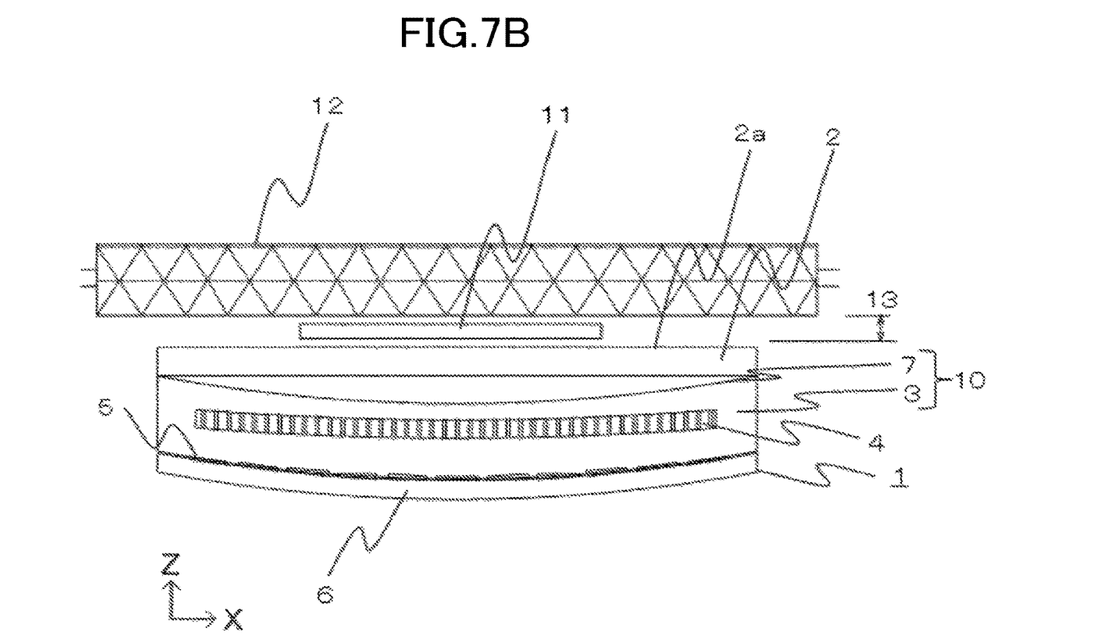
FIG. 7B is a descriptive diagram regarding a frame in FIG. 7A.

FIG. 7A is a diagram illustrating a document reading position of the image-reading apparatus according to Embodiment 1 of the present disclosure. FIG. 7B is a descriptive diagram regarding the frame in FIG. 7A. FIG. 7A and FIG. 7B are referred to collectively as FIG. 7. In the image-reading apparatus 1 according to Embodiment 1, the transparent plate 2 is configured as a flat structure along the main scanning direction. In other words, the reading surface 2a of the transparent plate 2 is configured as a flat structure along the main scanning direction. In doing so, the area between the reading surface 2a of the transparent plate 2 and the roller platen 12 that conveys and presses against the reading target 11 is free of any space that alters the distance in the gap along the main scanning direction therebetween, and thus the distance between the reading surface 2a and the platen roller 12 is uniform in the main scanning direction. Accordingly, it is easy to obtain read images with stable MTF performance as the images read are clear because the position between the focal point 8 of the lens array 4 on the side of the reading target 11 and the position of the reading target 11 is uniform along the main scanning direction.

Embodiment 2

Figure 9A:
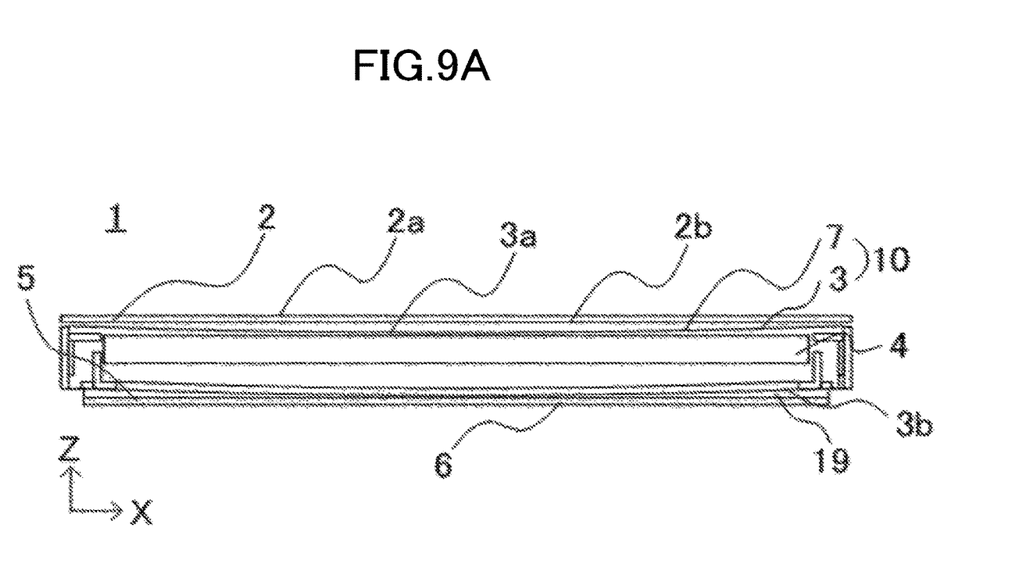
FIG. 9A is a cross-sectional diagram in the main scanning direction of an image-reading apparatus according to Embodiment 2 of the present disclosure.
Figure 9B:
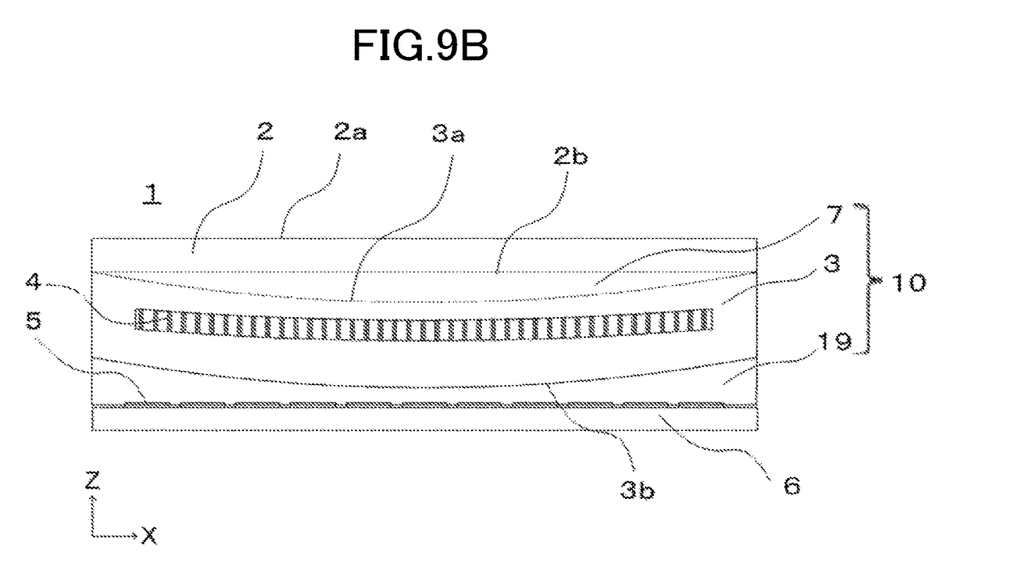
FIG. 9B is a descriptive diagram regarding a frame in FIG. 9A.

FIG. 9A is a cross-sectional diagram in the main scanning direction of an image-reading apparatus according to Embodiment 2 of the present disclosure. FIG. 9B is a descriptive diagram regarding the frame in FIG. 9A. FIG. 9A and FIG. 9B are referred to collectively as FIG. 9. The long sides of the opening of the frame 3 on the side of the reading target 11 include both the first layer 7 that is flat in the long side direction and is provided on the side of the reading target 11 and the second layer 3 that is continuous with the first layer 7, and the interface between the first layer 7 and the second layer 3 is curved (curved surface 3a). Furthermore, the long sides of the opening of the frame 3 on the side that is opposite to the side of the reading target 11, that is, the side of the sensor base 6 include both a third layer 19 that is flat and is provided on the side of the of the sensor base 6 and the second layer 3 that is continuous with the third layer 19, and the interface between the third layer 19 and the second layer 3 is curved (curved surface 3b).

In FIG. 9, the third layer 19 is provided is provided as a component that supports the sensor base 6 which is a flat plate. The sensor base 6 is made with a resin or a ceramic. The sensor base 6 on the side of the reading target 11, that is, the surface on which the sensor element array 5 is mounted is flat-shaped along the main scanning direction.

The portion that includes the first layer 7, the second layer 3, and the third layer 19 may be termed as the frame 3 or the second layer 3 along may be termed as the frame 3. In the description below, the premise is that the frame 3 is the second layer 3, the first layer 7 on the side of the reading target 11 is continuous with this frame 3, and the third layer 19 on the side of the frame 3 opposite to the reading target 11 (that is, the side of the sensor base 6) is continuous with the frame 3, that is, the first layer 7 and third layer 19 are continuous with the frame 3. The frame 3 has a rectangular-shaped opening on the side of reading target 11 such as the document 11. The frame 3 is made with metal such as aluminum or a resin. The frame 3 on the side of the reading target 11 is warped in the main scanning direction (long side direction) and is shaped with a curved surface 3a that is a recessed curve along the main scanning direction (long side direction). Also, the frame 3 on the side opposite to the reading target 11 is warped in the main scanning direction (long side direction) and has the curved surface 3b that is a convex curve along the main scanning direction (long side direction). The frame 3 houses or retains the sensor base 6 on which the lens array 4 and the sensor element array 5 are mounted.

Similar to the first layer 7, the third layer 19 is also an adhesive layer 19 formed (that is, stacked upon by the frame 3) by the hardening of an adhesive inserted between the frame 3 and the sensor base 6 in a manner similar to the formation method of the first layer 7 described in Embodiment 1. The frame 3 in a state in which the adhesive layer 7 is stacked on the frame 3 and the adhesive layer 19 is stacked upon by the frame 3 is also referred to as the housing 10.

Accordingly, it is easy to obtain read images of the reading target 11 with stable MTF performance as the image read are clear because the focal point 9 of the lens array 4 on the sensor element 5 side is capable (uniform) along the main scanning direction because the reading surface 2a of the transparent plate 2 is flat along the main scanning direction, the sensor element array 5 of the sensor base 6 is flat along the main scanning direction, and the lens array 4 is also flat in the main scanning direction.

In a case in which the sensor base 6 has a high rigidity, a similar effect can be achieved by alternatively fixing the sensor base 6 to the center portion of the frame 3 in the main scanning direction with a fastening member such as a screw.

Embodiment 3

In Embodiment 3 of the present disclosure, the holder 16, as illustrated in FIG. 2 and FIG. 4, is provided at the ends in the X-axis direction of the light guide 14 extending in the main scanning direction (X-axis direction, longitudinal direction, long side direction). The ends of the light guide 14 in the main scanning direction (X-axis direction, longitudinal direction, long side direction) are inserted into the holes of the holder 16. The holder 16 into which the light guide 14 is inserted is fixed to the ends of the support 15 and the frame 3 in the main scanning direction (X-axis direction, longitudinal direction, long side direction), the holder 16 sandwiching the light guide 14 together with the flat surface of the support 15 projecting in the sub-scanning direction and the erected portion of the support 15 that is inclined upwards from the flat surface. The support 15 and the holder 16 sandwiching the light guide 14 are also referred to as the light guide retaining member.

That is, the light guide 14 is not influenced by warpage of the frame 3 in the main scanning direction (X-axis direction, longitudinal direction, long side direction) because the light guide 14 is fixed to the ends of the frame 3 in the main scanning direction (X-axis direction, longitudinal direction, long side direction) by the holder 16 and the support 15 that are fixed to the ends of the frame 3 in the main scanning direction (X-axis direction, longitudinal direction, long side direction).

Accordingly, by attaching the light guide 14 to the frame 3 in the main structure in Embodiment 1 and Embodiment 2, the light guide 14 can be attached parallel to the flat surface 2b of the transparent plate 2 along the main scanning direction without being affected by the curved surface 3b of the frame 3, and thus the lens array 4 can easily obtain a stable light quantity along the main scanning direction. As a result, a stable light quantity is received by the lens array 4, an image-reading apparatus with stable MTF performance can be obtained.

REFERENCE SIGNS LIST

1 Image-reading apparatus
2 Transparent plate
2a Reading surface
2b Flat surface
3 Frame (Second layer)
3a Curved surface
3b Curved surface
4 Lens array (Lens portion)
5 Sensor element array (Sensor element)
6 Sensor base
7 Adhesive (Adhesive layer, first layer)
8 Focal point
9 Focal point
10 Housing
11 Document (Reading target)
12 Platen roller
13 Space
14 Light guide
15 Support
16 Holder
17 Light source base
18 Light source
19 Adhesive (Adhesive layer, third layer)

The invention claimed is:

1. An image-reading apparatus comprising:
a housing having a rectangular-shaped opening on a side of a reading target;
a lens portion retained or housed within the housing; and
a sensor element to receive light condensed by the lens portion, the light being from the reading target,
wherein
walls of the housing form long sides of the rectangular-shaped opening include a first layer and a second layer disposed in order from the side of the reading target,
the first layer has a surface that is flat on the side of the reading target, and
an interface between the first layer and the second layer is curved to be in an arched shape warping from a center portion of the rectangular-shaped opening in a direction of the long sides.

2. The image-reading apparatus according to claim 1, wherein the first layer is an adhesive that is stacked on the second layer.

3. The image-reading apparatus according to claim 2, wherein the adhesive has thermosetting properties, room temperature hardening properties, or ultraviolet hardening properties.

4. The image-reading apparatus according to claim 1, wherein the first layer supports a transparent plate that is flat-shaped.

5. The image-reading apparatus according to claim 4, wherein an area between the transparent plate and the second layer is filled with the first layer, the first layer supporting the transparent plate.

6. The image-reading apparatus according to claim 1, wherein the walls of the housing formed of the long sides of the rectangular-shaped opening further include a third layer disposed on the second layer on a side opposite to the side of the reading target, and an interface between the second layer and the third layer is curved.

7. The image-reading apparatus according to claim 6, wherein the third layer is a second adhesive that is stacked below the second layer.

8. The image-reading apparatus according to claim 7, wherein the second adhesive has thermosetting properties, room temperature hardening properties, or ultraviolet hardening properties.

9. The image-reading apparatus according to claim 6, wherein the third layer retains a sensor base on which the sensor element is mounted, the sensor base being flat-shaped.

10. The image-reading apparatus according to claim 9, wherein an area between the sensor base and the second layer is filled with the third layer, the third layer retaining the sensor base.

11. The image-reading apparatus according to claim 1, further comprising:
a light guide extending in the direction along the long sides, the light guide emitting light to the reading target; and
a light guide retaining member attached to both ends of the light guide in the direction along the long sides, the light guide retaining member retaining the light guide;
wherein the light guide retaining member is fixed to both ends of the housing in the direction along the long sides.

12. The image-reading apparatus according to claim 2, wherein the first layer supports a transparent plate that is flat-shaped.

13. The image-reading apparatus according to claim 3, wherein the first layer supports a transparent plate that is flat-shaped.

14. The image-reading apparatus according to claim 2, wherein the walls of the housing formed of the long sides of the rectangular-shaped opening further include a third layer disposed on the second layer on a side opposite to the side of the reading target, and an interface between the second layer and the third layer is curved.

15. The image-reading apparatus according to claim 3, wherein the walls of the housing formed of the long sides of the rectangular-shaped opening further include a third layer disposed on the second layer on a side opposite to the side of the reading target, and an interface between the second layer and the third layer is curved.

16. The image-reading apparatus according to claim 4, wherein the walls of the housing formed of the long sides of the rectangular-shaped opening further include a third layer disposed on the second layer on a side opposite to the side of the reading target, and an interface between the second layer and the third layer is curved.

17. The image-reading apparatus according to claim 5, wherein the walls of the housing formed of the long sides of the rectangular-shaped opening further include a third layer disposed on the second layer on a side opposite to the side of the reading target, and an interface between the second layer and the third layer is curved.

18. The image-reading apparatus according to claim 7, wherein the third layer retains a sensor base on which the sensor element is mounted, the sensor base being flat-shaped.

19. The image-reading apparatus according to claim 8, wherein the third layer retains a sensor base on which the sensor element is mounted, the sensor base being flat-shaped.

20. The image-reading apparatus according to claim 6, further comprising:
- a light guide extending in the direction along the long sides, the light guide emitting light to the reading target; and
- a light guide retaining member attached to both ends of the light guide in the direction along the long sides, the light guide retaining member retaining the light guide;
- wherein the light guide retaining member is fixed to both ends of the housing in the direction along the long sides.

\* \* \* \* \*